Patented June 11, 1946

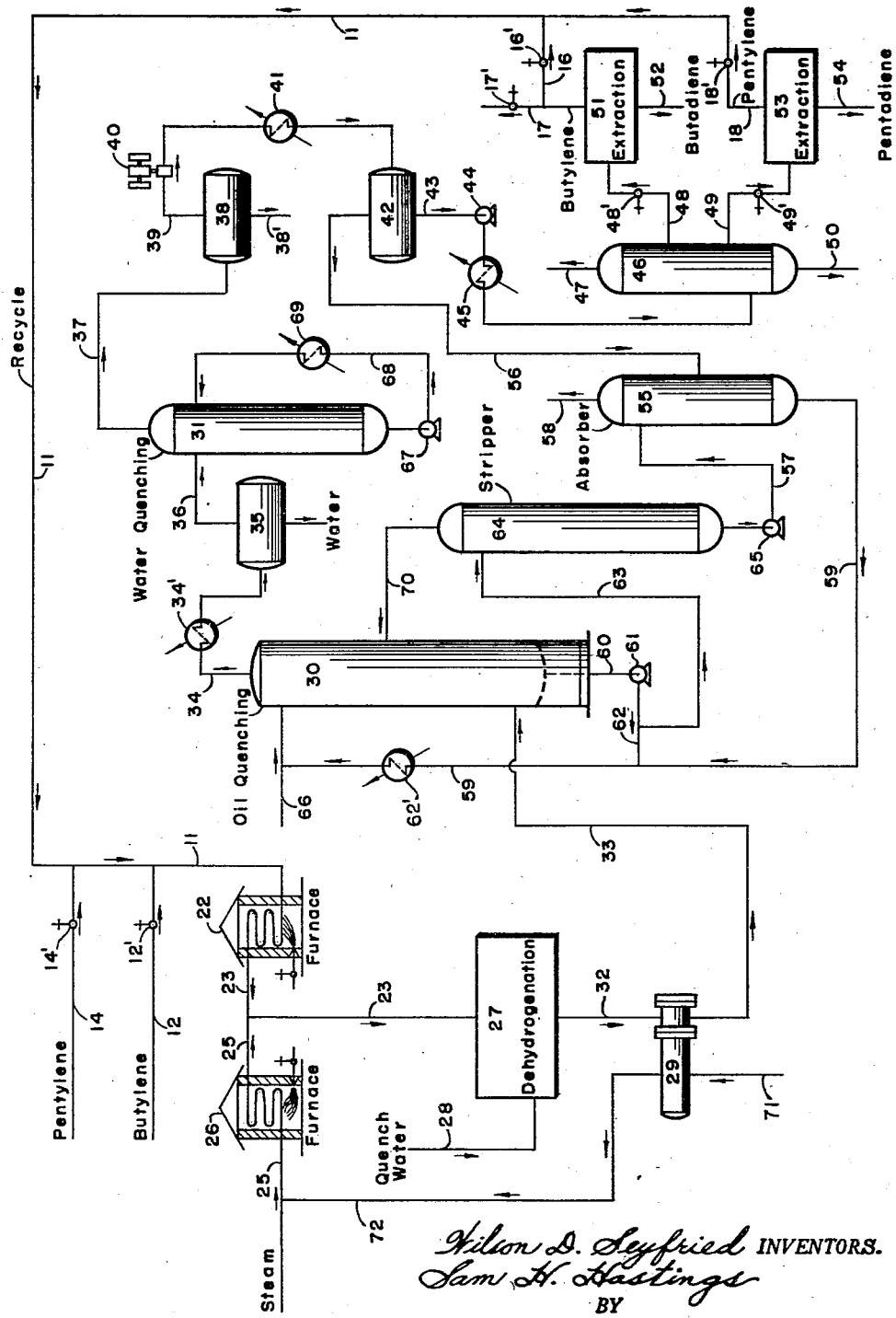

2,401,973

UNITED STATES PATENT OFFICE 2,401,973

DEHYDROGENATION OF BUTYLENE AND PENTYLENE

Wilson D. Seyfried and Sam H. Hastings, Baytown, Tex., assignors to Standard Oil Development Company, a corporation of Delaware Application November 27, 1944, Serial No. 565,372

7 Claims. (Cl. 260—680)

The present invention is directed to a method for dehydrogenating butylene and pentylene and to the effective use of a dehydrogenating catalyst for carrying out these reactions.

More specifically, the present invention may be said to include the use of a dehydrogenation catalyst suitable for converting $C_4$ and $C_5$ olefins into $C_4$ and $C_5$ dienes by employing the catalyst first for treating a butylene feed stock, utilizing the catalyst for this purpose until it has become ineffective or spent and then employing the spent catalyst for treating a pentylene feed stock to obtain $C_4$ and $C_5$ dienes.

At the present time, it is well-known to the art to pass a butylene feed stock admixed with steam over a catalyst capable of converting the butylenes into butadiene. A suitable dehydrogenation catalyst for such a purpose consists of approximately 80 per cent MgO, 14 per cent $Fe_2O_3$, 3 per cent $K_2O$ and 3 per cent CuO. When using fresh dehydrogenation catalyst, satisfactory yields are obtained with the temperature of the reaction maintained at approximately 1150° F. As the catalyst remains in service, it gradually loses its activity and in order to obtain a substantially constant conversion of butylene to butadiene the temperature of the reaction is raised. It has been found satisfactory to conduct the dehydrogenation reaction at temperatures in the range of 1150° to 1300° F. After the catalyst has been employed for some time, the temperature required to maintain the desired conversion of the feed stock becomes greater than 1300° F. and such temperatures cannot be employed without danger to the equipment. Accordingly, when the efficiency of the catalyst has decreased so that temperatures greater than approximately 1300° F. are required to maintain the rate of conversion constant, the catalyst is considered spent and is discarded or dumped.

It appears that the principal cause for the loss of activity in the dehydrogenation catalyst is the loss of potassium through volatilization. The potassium in the catalyst is necessary for the promotion of the water gas activity of the catalyst and loss of potassium from the catalyst is accompanied by increase in the carbon deposited on the catalyst. When a substantial amount of carbon has been deposited on the catalyst its selectivity for the butylene dehydrogenation reaction has been substantially diminished. The dehydrogenation catalyst which heretofore has been considered spent and discarded may contain a substantial proportion of carbon, for example, the spent catalyst may comprise 0.5 weight per cent of carbon.

In accordance with the present invention, a dehydrogenation catalyst is employed for converting butylene to butadiene and is maintained in this service until it loses its activity at temperatures of the order of 1300° F. and the catalyst is then employed to treat a pentylene feed stock to convert it to $C_4$ and $C_5$ dienes. The reaction temperature, when employing the catalyst for the dehydrogenation of the pentylene feed stock may be within the range of 1150° to 1300° F. When employing this catalyst, previously considered spent, for the dehydrogenation of pentylene feed stocks, substantial yields of $C_5$ conjugated dienes, which are nearly entirely valuable isoprene, are obtained. The catalyst conveniently employed for dehydrogenating butylene having a composition of 80 per cent MgO, 14 per cent $Fe_2O_3$, 3 per cent $K_2O$ and 3 per cent CuO is relatively expensive and at present has a market value of approximately $60.00 per ton. The method of the present invention effectively utilizes this expensive catalyst and enables a substantial yield of $C_4$ and $C_5$ dienes to be obtained after it is no longer suitable for converting a butylene feed stock.

An embodiment suitable for the practice of the present invention will now be described in conjunction with the drawing in which the sole figure is in the form of a diagrammatic flow sheet.

Turning now specifically to the drawing, a line 11 is arranged to discharge into furnace 22 which, in turn, is connected through line 23 to a reaction vessel 27 containing a dehydrogenation catalyst and which serves as a dehydrogenation zone.

When vessel 27 is charged with fresh dehydrogenation catalyst, a butylene feed stock is discharged into line 11 by means of inlet line 12, valve 12' for controlling line 12 being open for this purpose. It will be seen that an inlet line 14 controlled by valve 14' is also arranged to discharge into line 11 and is indicated as being connected to a supply of pentylene, not shown, but when a fresh catalyst is present in reaction zone 27, valve 14' is closed so that only butylene feed stock is present in line 11.

The pentylene feed stock discharged through inlet 12 to line 11 is passed through furnace 22 where it is heated to a suitable reaction temperature and withdrawn from furnace 22 through line 23 to reaction zone 27 where it comes in contact with the dehydrogenation catalyst. The catalyst employed may have a composition of 80 per cent MgO, 14 per cent $Fe_2O_3$, 3 per cent $K_2O$ and 3 per cent CuO. When fresh catalyst is present in zone 27, it is desirable to conduct the dehydrogenation reaction therein at a temperature of approximately 1150° F. but as the catalyst is retained in service and becomes less active, it is desirable to elevate the temperature in the reaction zone to maintain the conversion at a substantially constant rate and the temperature within zone 27 may, accordingly, be gradually increased as the catalyst remains in service until the zone 27 is being operated at a temperature of approximately 1300° F.

The hot hydrocarbon feed stock passing from furnace 22 through dehydrogenation zone 27 has a substantial quanity of hot steam added thereto through inlet 25. The amount of steam may be varied from 3 to 15 volumes of steam per volume of hydrocarbon feed and should be heated to approximately the same temperature as the hydrocarbon to which it is mixed by being passed through furnace 26. The mixture of hydrocarbons and steam pass together into dehydrogenation zone 27.

Following the dehydrogenation step, the reaction products are reduced in temperature as rapidly as possible by the introduction of a water spray into the lower portion of the dehydrogenation reaction zone by means of line 28, and by a heat exchanger 29, an oil quenching zone 30 and a water quenching zone 31. The mixture of hydrocarbon reaction products and steam is withdrawn from dehydrogenation zone 27 by line 32 and passed through heat exchanger 29, which is in the form of a waste heat boiler, and thence by line 33 into oil quenching tower 30. The vapors pass from the oil quenching zone through line 34, containing cooler 34', and into separator 35 to separate water from the hydrocarbon vapors and from this operating zone the vapors pass on through line 36 to water quenching tower 31. Vapors from water quenching tower 31 are withdrawn through line 37, passing into a second settling drum 38 to remove condensate from the vapors through line 38', and thence through line 39 containing compressor 40 and cooler 41, into separating vessel 42.

The liquid accumulating in vessel 42 contains the desired butadiene. Accordingly, this fraction is withdrawn through line 43, pump 44 and cooler 45 and is discharged into distillation zone 46. It will be noted that column 46 is shown as provided with an outlet line 47 for the removal of an overhead fraction, a line 48 for removal of a side stream, a line 49 for removal of a lower side stream and an outlet 50 for removal of a bottoms fraction. Line 48 is controlled by valve 48' and discharges into an extraction zone 51 which is for the purpose of separating a C₄ fraction into butylene and butadiene. Line 49 is controlled by valve 49' and discharges into an extraction zone 53 which is for the purpose of separating pentylene from C₅ dienes. The butadiene extraction plant 51 and the pentadiene extraction plant 53 may both employ an ammoniacal cuprous acetate solution as the solvent. It will be understood that any solvent may be employed which will form addition products with the diolefins and which will release the diolefins when the addition products are subjected to a suitable treatment. When butylene is being employed as the feed for the process, the amount of C₅ hydrocarbons discharged into distillation column 46 will usually be so small that it is not desirable to solvent extract a C₅ fraction and; accordingly, valve 49' may be closed and the mixture separated in column 46 into 3 fractions, an overhead withdrawn through line 47, a C₄ fraction withdrawn through line 48 and a bottom fraction withdrawn from outlet 50. It will be understood that although a single vessel 46 has been shown for conducting a distillation step, in practice it may be desirable to employ a series of distillation columns.

The C₄ fraction passed through line 48 to butadiene extraction plant 51 is separated into a finished butadiene fraction which is discharged through outlet 52 and a butylene fraction withdrawn through line 16 controlled by valve 16'. When operating with butylene as the feed stock, valve 16' is opened and the butylenes from extraction zone 51 are passed through line 16 to recycle line 11 where they are mingled with fresh feed from inlet 12 and the mixture passed into furnace 22. An outlet line 17 controlled by valve 17' is connected with line 16 but when using butylene as a feed, the valve 17' is closed to prevent the withdrawal of butylenes.

It is preferred to operate oil quenching tower 30 in conjunction with an absorber unit 55. In separating vessel 42, the vaporous fraction may contain appreciable amounts of desirable C₄ hydrocarbons. These vapors may be passed through line 56 to absorber vessel 55 where they flow countercurrent to a steam of oil injected into an upper portion of vessel 55 via line 57. The unabsorbed vapors from absorber vessel 55 may be removed from the system via outlet 58. Rich absorber oil is withdrawn from the bottom of absorber 55 by line 59 and may be returned to the top of quenching tower 30 to act as quenching oil therein. The oil accumulating in the lower portion of oil quenching tower 30 is removed through line 60 containing pump 61 and the stream split, with a portion being added by connection 62 to the oil flowing in line 59, the remainder flowing through branch 63 to stripping tower 64; line 59 is provided with a cooler 62' for cooling the oil flowing therethrough. In this stripping tower the lighter constituents are removed as vapor and returned to the quenching tower through line 70, and the lean oil is removed via line 57 containing pump 65 and passed into absorber tower 55. If desired, make-up lean oil may be added via inlet 66 to the oil being circulated through line 59. Water quenching tower 31 is conventional and is provided with water circulating line 67 containing pump 68 and cooler 69.

Water is introduced through line 71 into waste heater boiler 29, picks up heat from the hydrocarbon reaction products introduced by line 32, and is converted to steam. This steam discharges from waste heat boiler 29 by line 72, mixes with the steam introduced into the system by line 25 and the mixture passes through the furnace 26 and is admixed with the heated hydrocarbon feed stock flowing through line 23 as previously described.

After the catalyst has been in service for such a period of time that it is considered spent with respect to the conversion of butylene feed stock to butadiene, the operation is changed to employ the catalyst for dehydrogenating a pentylene feed stock. The operation is changed from the treatment of a butylene feed stock to the treatment of pentylene feed stock by closing valve 12' in inlet line 12 and opening valve 14' in inlet line 14. With this valve setting a pentylene feed stock discharges into recycle line 11 and is passed through furnace 22, mixed with steam in line 23 and discharged into the reaction zone 27 where it comes into contact with the dehydrogenation catalyst. The product obtained from dehydrogenation zone 27 when employing pentylene as a feed stock includes desirable C₅ dienes as well as desirable C₄ dienes. This product requires rapid quenching as does the product obtained when using a butylene as the feed stock and, accordingly, the product may be taken through oil quenching zone 30 and water quenching zone 31 and quenched in the same manner as described in conjunction with the use of a butylene feed stock. Vapors from vessel 31 are withdrawn through line 37 and passed to vessel 38 where condensed water is removed therefrom and the vapors then pass through line 39, compressor 40 and cooler 41 to separator vessel 42.

In vessel 42 the condensed materials include valuable C₅ dienes, as well as butadiene, while the uncondensed materials may include C₄ and C₅ hydrocarbons. The uncondensed vapors are withdrawn from vessel 42 through line 56 and passed to the absorber vessel 55 which is operated in conjunction with the stripper 64 and oil quenching zone 30 in the same way that it is operated when using a butylene feed stock.

The mixture of C₄ and C₅ dienes is withdrawn from vessel 42 through line 43, pump 44 and cooler 45 and discharged into distillation zone 46. When using pentylene as the feed stock, both butadiene and C₅ dienes are separated by distillation zone 46 and, accordingly, both valve 48' and valve 49' are open so that side streams may be withdrawn through lines 48 and 49 and sent to extraction zone 51 and extraction zone 53, respectively. An overhead fraction is discarded from distillation zone 46 via line 47, a light side stream is withdrawn by line 48 and sent to an extraction zone 51 where it is separated into a butadiene fraction withdrawn through outlet 52 and a butylene fraction which is withdrawn through line 16 and outlet 17 and passes through open valve 17' to be withdrawn from the system. A heavier side stream is withdrawn through line 49 and passed to the C₅ diene extraction zone 53 where the C₅ dienes, of which isoprene constitutes the major portion, is withdrawn through outlet 54 while the pentylenes are withdrawn through line 18 controlled by valve 18'. Valve 18' is opened when a pentylene feed stock is being charged into the system so that the pentylene may enter line 11 and be recycled to furnace 22.

In the use of the catalyst in accordance with the present invention, it is preferred to employ it for treating a butylene feed stock with the temperature of the reaction zone for the fresh catalyst at approximately 1150° F. and the temperature gradually increased to 1300° F. to maintain the rate of conversion constant. When changing from butylene feed stock to pentylene feed stock, it is desirable to lower the temperature of the reaction zone to approximately 1150° F. and as the catalyst remains in service for converting the pentylene, the temperature is gradually raised until it is increased to 1300° F. When the effectiveness of the catalyst for converting pentylene becomes so low that the process is no longer economically profitable, the process is terminated and the catalyst dumped. Fresh catalyst is charged to reaction zone 27 and the cycle repeated with butylene employed as a feed stock for the fresh catalyst and pentylene employed as the feed stock after the catalyst becomes spent with respect to the butylene feed. It may be stated that the dehydrogenating catalyst will usually be found desirable for the treatment of butylene feed stock until it contains approximately .5 per cent carbon and thereafter the catalyst may be satisfactorily used for treating a pentylene feed stock until the carbon increases to as much as 4 per cent.

The yields which may be obtained when employing a dehydrogenation catalyst for treating a pentylene feed stock after it is considered spent with regard to the dehydrogenation of butylene feed stock is indicated by the following table. In obtaining these results, the dehydrogenating catalyst employed originally had a composition of 80 per cent MgO, 14 per cent Fe₂O₃, 3 per cent K₂O and 3 per cent CuO. This catalyst was employed for the dehydrogenation of butylenes to butadiene and was then used for treating pentylene feed stock. The mole composition of the pentylene feed stock charged to the catalyst was approximately as follows:

Isopentane _____ 32.1
Normal pentane _____ 25.3
Tertiary pentylenes _____ 13.4
Pentylene-1 _____ 15.8
Pentylene-2 _____ 12.5
Conjugated pentadienes _____ 0.9

*Table*

|  | Run No. | | |
| --- | --- | --- | --- |
|  | 1 | 2 | 3 |
| Cat. age, cycles | 219 | 230 | 262 |
| Reactor product analyses, mole percent: |  |  |  |
| Carbon dioxide | 5.1 | 6.7 | 6.2 |
| Hydrogen | 19.8 | 24.9 | 19.6 |
| Methane | 5.7 | 5.6 | 3.9 |
| Ethane | 4.7 | 5.8 | 3.8 |
| Propane | 4.0 | 3.9 | 2.8 |
| Butanes |  |  |  |
| Isobutylene | 7.7 | 5.1 | 3.8 |
| Normal butylenes |  |  |  |
| Butadiene |  |  |  |
| Pentanes | 33.2 | 32.6 | 37.2 |
| Tertiary pentylenes | 3.8 | 3.7 | 6.6 |
| Normal pentylenes | 11.1 | 7.6 | 10.5 |
| Conj. pentadienes [1] | 4.1 | 4.1 | 4.6 |
| Yield data, mole percent: |  |  |  |
| Conversion of total C₅ | 19.2 | 19.0 | 12.1 |
| Yield of total C₄ [2] | 11.7 | 8.6 | 5.6 |
| Yield of butadiene [3] | 3.1 | 3.0 | 1.9 |
| Conversion of C₅ olefins | 42.7 | 48.8 | 35.6 |
| Selectivity to C₅ conj. dienes [2] | 29.7 | 29.2 | 39.2 |
| Yield of C₅ conj. dienes [2] | 12.7 | 14.3 | 14.0 |

[1] Reactive with maleic anhydride.
[2] Based on C₅ olefins; assumed 1% C₅ conj. dienes in feed appears in product; isoprene constitutes major portion of C₅ conjugated dienes.
[3] Based on total C₄.

It is estimated that in runs 1 and 2 the catalyst included approximately 2.0 per cent carbon, and in run 3 the catalyst included 2.5 per cent carbon.

While the above table is given by way of showing the specific yields which may be obtained when operating in accordance with the present invention, it is to be understood that this data is given only by way of example and not by way of limitation.

Having fully described and illustrated the practice of the present invention, what we desire to claim is:

1. A method for treating hydrocarbons including the steps of passing a feed stock comprising butylenes over a dehydrogenation catalyst predominantly composed of magnesium oxide and iron oxide under conditions to cause the conversion of a substantial portion of butylene to butadiene, continuing said reaction until a substantial amount of carbon is deposited on the catalyst and the activity of the catalyst for converting butylene to butadiene is substantially diminished, and subsequently passing a feed stock comprising a substantial amount of pentylene over said catalyst under conditions to cause the formation of a substantial amount of C4 and C5 dienes.

2. A method in accordance with claim 1 in which a butylene feed stock is passed over the catalyst under conditions to cause the formation of butadiene until approximately .5 per cent of carbon is deposited on the catalyst and in which the feed stock comprising a substantial amount of pentylene is passed over the catalyst until approximately 4 per cent of carbon is deposited thereon.

3. A method for treating hydrocarbons comprising the steps of passing a first feed stock including a substantial amount of butylene through a reaction zone containing fresh dehydrogenation catalyst having a composition of approximately 80 per cent MgO, 14 per cent Fe2O3, 3 per cent K2O and 3 per cent CuO under temperature and pressure conditions to cause the conversion of a substantial amount of butylene to butadiene, continuing the flow of the first feed stock through the reaction zone until the catalyst loses its activity with respect to the conversion of butylene to butadiene, subsequently terminating the flow of the first feed stock over the catalyst and passing a second feed stock comprising a substantial portion of pentylene over the catalyst and maintaining the temperature and pressure conditions in the reaction zone to cause the conversion of a substantial amount of pentylene to C4 and C5 dienes.

4. A method in accordance with claim 3 in which the first feed stock is passed to the reaction zone until approximately .5 per cent of carbon is deposited on the catalyst and in which the second feed stock is passed through the reaction zone until approximately 4 per cent of carbon is deposited on the catalyst.

5. A method in accordance with claim 3 in which the temperature of the catalyst is approximately 1150° F. when the first feed stock is passed over the fresh catalyst and the temperature in the reaction zone is increased as the activity of the catalyst diminishes until the temperature is approximately 1300° F. and in which the flow of the first feed stock is terminated when the conversion of the butylene to butadiene diminishes at a temperature of 1300° F.

6. A method in accordance with claim 3 in which the first feed stock is passed over the fresh catalyst at a temperature of approximately 1150° F. and at which the temperature of the reaction zone is gradually increased until the temperature is approximately 1300° F. and is maintained until approximately 0.5% carbon is deposited on the catalyst and the flow of the first feed stock is terminated and the second feed stock then passed over the reaction zone and the catalyst maintained at a temperature of 1150° to 1300° F. until approximately 4 per cent carbon has deposited on the catalyst.

7. A method for treating hydrocarbons including the steps of passing a feed stock comprising butylenes over a dehydrogenation catalyst composed of magnesium, iron, potassium and copper in the form of oxygen-containing compounds under conditions to cause the conversion of a substantial portion of butylene to butadiene, continuing said reaction until a substantial amount of carbon is deposited on the catalyst and the activity of the catalyst for converting butylene to butadiene is substantially diminished, and subsequently passing a feed stock comprising a substantial amount of pentylene over said catalyst under conditions to cause the formation of a substantial amount of C4 and C5 dienes.

WILSON D. SEYFRIED.
SAM H. HASTINGS.